(12) United States Patent
Hébert (10) Patent No.: US 8,135,578 B2
(45) Date of Patent: Mar. 13, 2012

(54) CREATION AND USE OF APPLICATION-GENERIC CLASS-BASED STATISTICAL LANGUAGE MODELS FOR AUTOMATIC SPEECH RECOGNITION

(75) Inventor: Matthieu Hébert, Melocheville (CA)

(73) Assignee: Nuance Communications, Inc., Burlington, MA (US)

(*) Notice: Subject to any disclaimer, the term of this patent is extended or adjusted under 35 U.S.C. 154(b) by 1206 days.

(21) Appl. No.: 11/845,015

(22) Filed: Aug. 24, 2007

(65) Prior Publication Data

US 2009/0055184 A1    Feb. 26, 2009

(51) Int. Cl.
*G06F 17/27* (2006.01)

(52) U.S. Cl. .................. 704/9; 704/1; 704/10; 704/231; 704/244; 704/257; 704/270.1

(58) Field of Classification Search .................. 704/9, 1, 704/10, 231, 244, 257, 270.1
See application file for complete search history.

(56) References Cited

U.S. PATENT DOCUMENTS

| | | | |
|---|---|---|---|
| 6,243,677 B1 * | 6/2001 | Arslan et al. .................. 704/244 |
| 6,513,010 B1 * | 1/2003 | Lewin et al. .................. 704/270.1 |
| 6,604,075 B1 * | 8/2003 | Brown et al. .................. 704/270.1 |
| 6,615,172 B1 * | 9/2003 | Bennett et al. .................. 704/257 |
| 6,631,346 B1 * | 10/2003 | Karaorman et al. .................. 704/9 |
| 6,675,159 B1 * | 1/2004 | Lin et al. .................. 1/1 |
| 6,937,983 B2 * | 8/2005 | Romero .................. 704/257 |
| 7,191,119 B2 * | 3/2007 | Epstein et al. .................. 704/10 |
| 7,624,007 B2 * | 11/2009 | Bennett .................. 704/9 |
| 7,716,039 B1 * | 5/2010 | Bangalore et al. .................. 704/9 |
| 2002/0111803 A1 * | 8/2002 | Romero .................. 704/231 |
| 2003/0191625 A1 * | 10/2003 | Gorin et al. .................. 704/1 |
| 2003/0212543 A1 * | 11/2003 | Epstein et al. .................. 704/9 |
| 2005/0108001 A1 * | 5/2005 | Aarskog .................. 704/10 |
| 2005/0154580 A1 * | 7/2005 | Horowitz et al. .................. 704/9 |
| 2006/0074631 A1 * | 4/2006 | Wang et al. .................. 704/9 |
| 2006/0271351 A1 | 11/2006 | Mirkovic et al. |
| 2006/0271364 A1 | 11/2006 | Mirkovic et al. |
| 2007/0043562 A1 | 2/2007 | Holsinger et al. |
| 2007/0179777 A1 | 8/2007 | Gupta et al. |

OTHER PUBLICATIONS

PCT Search Report and Written Opinion, PCT/US08/74261, mailed on Nov. 19, 2008, 9 pages.

"Chapter 5, Say Anything: Statistical language models and robust interpretation," *Nuance Speech Recognition System, Version 8.0, Grammar Developer's Guide*, Nuance Communications, Inc., Menlo Park, California, 1996, pp. 69-86.

"<ruleref> element," VoiceXML 2.1 Development Guide, Voxeo Corporation, 2003, downloaded from http://www.vxml.org/ruleref.htm, Jul. 26, 2007, 3 pages.

(Continued)

*Primary Examiner* — Michael Colucci
(74) *Attorney, Agent, or Firm* — Michael A. Glenn; Glenn Patent Group (57) ABSTRACT

A method of creating an application-generic class-based SLM includes, for each of a plurality of speech applications, parsing a corpus of utterance transcriptions to produce a first output set, in which expressions identified in the corpus are replaced with corresponding grammar tags from a grammar that is specific to the application. The method further includes, for each of the plurality of speech applications, replacing each of the grammar tags in the first output set with a class identifier of an application-generic class, to produce a second output set. The method further includes processing the resulting second output sets with a statistical language model (SLM) trainer to generate an application-generic class-based SLM.

22 Claims, 4 Drawing Sheets

OTHER PUBLICATIONS

"Speech Recognition Grammar Specification (SRGS)," VoiceXML Tutorial, downloaded from http://www.voicesmltutorial.com/tutorial.php?tutorial_id=7, Jul. 26, 2007, 3 pages.

"What is Statistical Language Modeling (SLM)," downloaded from http://homepages.inf.ed.ac.uk/s0450736/slm.html, Aug. 4, 2007, 3 pages.

Rosenfeld, Ronald, "Two Decades of Statistical Language Modeling: Where Do We Go From Here?," Proceedings of the IEEE, 88(8), 2000, pp. 1270-1278.

Bellegarda, Jerome R., "Statistical language model adaptation: review and perspectives," Speech Communication 42 (2004), pp. 93-108.

Lefevre, Fabrice et al., "Multi-source Training and Adaptation for Generic Speech Recognition," 8th European Conference on Speech Communication and Technology, Eurospeech 2003, Geneva, Switzerland, Sep. 2003, pp. 1877-1880.

Gao, Yuqing et al., "Portability Challenges in Developing Interactive Dialogue Systems," Acoustics, Speech, and Signal Processing, 2005, Proceedings, (ICASSP 05), IEEE International Conference on, vol. 5, Mar. 2005, pp. v/1017-v/1020.

Gillett, John et al., "A Language Combining Trigrams and Stochastic Context-Free Grammars," 5th International Conference on Spoken Language Processing, (ICLSP-98), Sydney, Australia, Nov. 1998.

Hebert, Matthieu, "Enhancing commercial grammar-based applications using robust approaches to speech understanding," Bridging the Gap: Academic and Industrial Research in Dialog Technologies Workshop Proceedings, NAACL-HLT, Rochester, NY, Apr. 2007, pp. 76-83.

Paek, Tim et al., "Handling Out-of-Grammer Commands in Mobile Speech Interaction Using Backoff Filler Models," Proceedings of SPEECHGRAM 2007, Prague, Czech Republic, Jun. 2007, pp. 33-40.

Gorrell, Genevieve et al., "Adding Intelligent Help to Mixed-Initiative Spoken Dialogue Systems," Proceedings of the Seventh International Conference on Spoken Language Processing, ICSLP 2002, Denver, Colorado, Sep. 2002.

* cited by examiner

CREATION AND USE OF APPLICATION-GENERIC CLASS-BASED STATISTICAL LANGUAGE MODELS FOR AUTOMATIC SPEECH RECOGNITION

FIELD OF THE INVENTION

At least one embodiment of the present invention pertains to automatic speech recognition, and more particularly, to the creation and use of application-generic class-based statistical language models for automatic speech recognition.

BACKGROUND

The use of automatic speech recognition (ASR) technology is now commonplace in everyday life. One application of such technology is in Interactive Voice Response (IVR) systems. IVR systems are commonly used to automate certain tasks that otherwise would be performed by a human being. More specifically, IVR systems are systems which create a spoken dialog between a human speaker and a computer system to allow the computer system to perform a task on behalf of the speaker, to avoid the speaker or another human being having to perform the task. This operation generally involves the IVR system's acquiring specific information from the speaker. IVR systems may be used to perform very simple tasks, such as allowing a consumer to select from several menu options over the telephone. Alternatively, IVR systems can be used to perform more sophisticated functions, such as allowing a consumer to perform banking or investment transactions over the telephone or to book flight reservations.

Current IVR systems typically are implemented by programming standard computer hardware with special-purpose software. In a basic IVR system, the software includes a speech recognition engine and a speech-enabled application (e.g., a telephone banking application) that is designed to use recognized speech output by the speech recognition engine. The hardware may include one or more conventional computer systems, such as server-class computers, personal computers (PCs), workstations, or other similar hardware. These computer systems may be configured by the software to operate in a client or server mode and may be connected to each other directly or through a network, such as a local area network (LAN) or the Internet. The IVR system also includes appropriate hardware and software for allowing audio data to be communicated to and from the speaker through an audio interface, such as a standard telephone connection.

The speech recognition engine (or "recognizer") recognizes speech from the speaker by comparing the speaker's utterances to one or more language models stored in a database. Two common types of language models used for this purpose are grammars and statistical language models (SLMs). At least for purposes of this document, the terms "grammar" and "SLM" have mutually exclusive meanings.

In this context, a "grammar" is a set of one or more words and/or phrases ("expressions"), i.e., sentence fragments, that a speaker is expected or required to utter in response to a corresponding prompt, and the logical relationships between those expressions. The logical relationships include the expected or required order of the expressions, and whether particular expressions are mandatory, optional, alternatives, etc. A recognizer may use various different grammars, according to the type of information required by the speech-enabled application. A grammar usually associates expressions to "tags" that represent meaningful pieces of information in the context of the speech application. A grammar is typically expressed in some form of grammar specification language, such as the Nuance Grammar Specification Language (GSL) or the grammar syntax specified by the Speech Recognition Grammar Specification Version 1.0, W3C Consortium, Mar. 16, 2004.

An SLM, on the other hand, is a model which assigns probabilities to words or sequences of words, i.e., probabilities that the words or word sequences will occur in a given speech context. An SLM is normally generated by applying a set of training data, or "corpus", to an SLM training algorithm, called an "SLM trainer". Examples of such algorithms are well-known in the art. The corpus can be a set of sample words and/or phrases ("transcriptions") that a speaker can say (or has said) in a given context or application. In that case, the SLM is a "word-based SLM". In general, the larger the corpus is, the better the quality the resulting SLM will be.

A "class-based SLM" is an SLM in which one or more of the word sequences have been replaced by a rule, which is called a "class". This approach is useful, for example, when the amount of training data for the SLM is limited. A class-based SLM allows certain words or sequences in the SLM to be grouped together and generalized, such as by using the general term (class) "City" to replace specific city names. Each class in a class-based SLM is defined by a separate grammar or SLM.

A central problem in the deployment of a successful commercial speech application is the upfront cost of developing the initial application. High accuracy is required "out-of-the-box" in order to satisfying the end customer, but this often requires pilot phases and speech scientists to optimize the accuracy of each component of the application. Consequently, it is very desirable to have reusable components that exhibit cross-application robustness, yet this is difficult to achieve.

To that end, ASR vendors commonly package generic grammars for collection of certain canonical pieces of information, such as date, time, digit strings, dollar amounts, etc. ASR vendors also supply acoustic models that are task-independent. SLMs, however, tend to be specific to the domain of the target application (task), so cross-application robustness is much harder to achieve for SLMs.

The portability of language models across applications has been extensively studied in the context of conversational speech recognition. There have been two main approaches to attempting to provide cross-domain (cross-application) robustness of language models: 1) to train the language model with a large amount of data from different sources with the hope that the resulting language model will be a good representation of the general language; or 2) to interpolate or adapt language models with domain-specific language models to improve language models using limited in-domain resources.

Class-based SLMs have been studied in the context of directed dialog commercial speech applications. However, all known studies relied on data from the target application to train the class-based SLMs and did not investigate the generic nature of class-based SLMs. One problem with this approach is that it is sometimes difficult and labor intensive to acquire a training corpus of sufficient size and quality for a particular target application.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A technique for creating and using application-generic class-based SLMs for ASR is introduced here. For purposes of explanation, the basic directed dialog applications considered herein are grammar-based. Achieving good grammar coverage for those types of applications can be challenging. However, class-based SLMs, for which the dialog-state-specific grammars from the grammar-based target application constitute the classes, tend to exhibit excellent portability across applications. As noted above, it is sometimes difficult and labor intensive to acquire a training corpus of sufficient size and quality to train an SLM for a particular target application. However, the present inventor has discovered the surprising result that the performance of an application-generic class-based SLM, when combined with the dialog-state-specific grammars from the target application, is about the same as that of a class-based SLM that has been specifically trained on the target application. Yet a generic class-based SLM substantially reduces the burden on the speech application provider by eliminating the need to acquire a training corpus to train an application-specific SLM.

As used hereinafter, the term "application-generic class-based SLM" (or simply "generic class-based SLM") means an SLM that has not been trained for any particular application. Hence, the technique introduced here is directed to creation of application-generic (hereinafter simply "generic") class-based SLM for directed dialog speech applications and the use of such SLM for ASR and/or to perform automatic transcription.

Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Stated briefly, the technique is as follows, according to one embodiment. Assume that corpora from a variety of directed dialog speech applications are available. For each application, the grammars that translate expressions to tags and a fairly large corpus of transcribed utterances are acquired. For each application, we select the contexts (dialog steps) for which only two grammars are active in parallel: a collection grammar and a command grammar. A collection grammar is a grammar that extracts a target piece of information for a given context (e.g., a city name, a time, a main menu item, etc.). A command grammar is a grammar that contains general commands (e.g., "help", "go back", "main menu", etc.) but can be context-specific. Limiting the number of active grammars to two helps to simplify the implementation of the process without reducing its impact; note, however, that extension of this technique to more than two grammars per context is straightforward. Hence, the technique being introduced here is not limited to use of only two active grammar classes.

The transcribed utterances (corpus) of each application are then parsed with a robust parser. More specifically, for each application, on a per-context basis the parser uses the existing application-specific grammars to identify and replace expressions in the corpus with tokens that represent the corresponding application-specific grammars. Each of those tokens is then classified as representing either a collection grammar or a command grammar and, accordingly, is replaced with a generic token representing collection grammar or a generic token representing command grammar, as appropriate. Collection grammar and command grammar are treated as two separate classes. The relabeled output of the parser is then gathered for all of the applications. Accordingly, a class-based SLM is then trained (created) on the collective modified (relabeled) outputs of the parser, which results in an application-generic class-based SLM.

Subsequently, given a new speech application which has existing grammars (one for generic commands, and one or more for application specific commands), a new IVR system can be created by incorporating the existing grammars for that application into the generic SLM in place of the above-mentioned tokens. That is, for each context for the application, each token mentioned above in the SLM is replaced with a token representing the specific command grammar or collection grammar (one or more command grammars and one or more collection grammars) for that context. This improves the system's overall handling of out-of-grammar utterances.

In addition, given a new application which has existing grammars and many collected utterances, the generic class-based SLM defined as described herein can also be used for automatic transcription. The resulting transcriptions can be used to train better SLMs for the task without manual transcriptions.

In both cases, the accuracy of the final speech application is increased, making it more robust to out-of-grammar utterances.

The technique will now be described in greater detail with reference to FIG. 1. The transcriptions 1 for each relevant context, and for each of N speech applications, are run through a robust parser 2. A "robust" parser is a parser that does not need its rule to span an entire utterance in order to successfully parse the utterance. Many robust parser algorithms are well known in the art and available today. For example, potentially suitable robust parsers include: 1) the parser described in J. Earley, "An efficient context-free parsing algorithm", Communications of the ACM, 6(8), pp. 451-455 (1970); and 2) the probabilistic CYK parser described in H. Ney, "Dynamic programming parsing for context-free grammars on continuous speech recognition", IEEE Transactions on Signal Processing, 39 (2), pp. 336-340 (1991).

For each context, the parser 2 examines the transcribed utterances 1 (sentences and/or sentence fragments) in the corpus to detect expressions in a grammar 3 for that context, and then replaces each of those expressions with a tag identifying the corresponding grammar.

Figure 1:
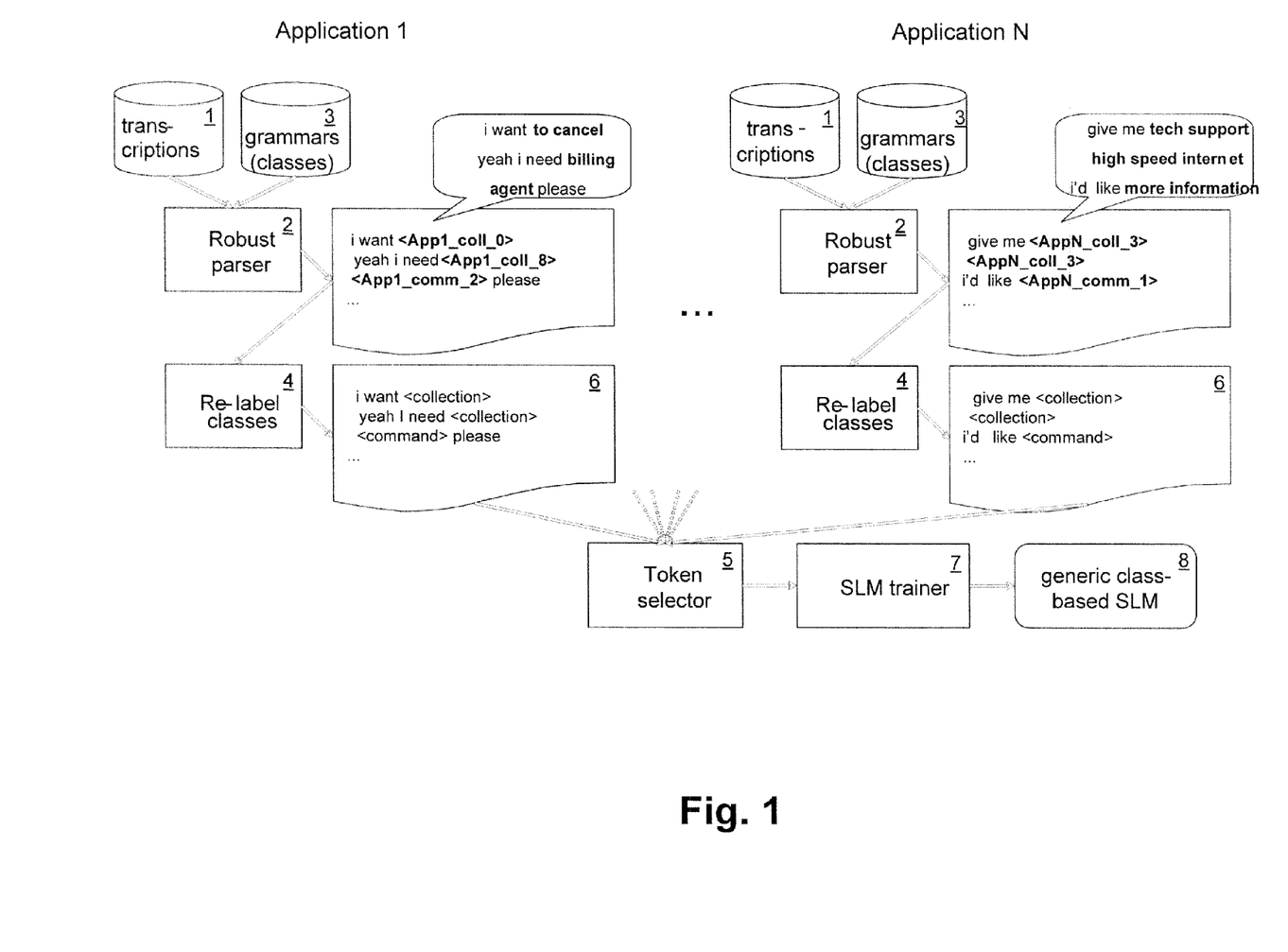
FIG. 1 illustrates a technique of creating an application-generic class-based SLM.

For example, as shown in FIG. 1, the parser 2 might replace the transcribed phrase "Yeah I need Customer Service" with "Yeah I need <App1_coll_8>", where the tag "<App1_coll_8>" identifies a specific collection grammar for Application_1.

For each application, the output of the parser 2 is then further processed to re-label each of the specific grammar names (classes that contain the rules of the robust parser) with a generic class name, "<collection>" or "<command>", depending upon whether the named grammar is a collection grammar or a command grammar, respectively. For example, as shown in FIG. 1, the re-labeling operation 4 would replace the tag "<App1_coll_8>" with the generic tag "<collection>". In contrast, the tag "<AppN_comm_1>" relates to a command grammar and therefore would be replaced by the tag "<command>". These generic class names act as stubs that will get resolved at run time, i.e., during actual use in the target speech application. This re-labeling 4 can also be viewed as a form of normalization, by which transcribed phrases from different sources (applications) are described by a common representation comprised of filler words and class tags.

A token selector 5 then filters all of the results 6 of the re-labeling operations 4 for each of the applications, based on one or more algorithms. For example, the token selector 5 can balances, based on the amount of data, the various sources, such that the resulting generic class-based SLM 8 is not dominated by data from a specific application. For example, if 20 data sources are available to train the class-based SLM, and those data sources include 100,000 transcriptions for Application_1 but only 100 transcriptions for each of Application_2 through Application_20, then some balancing of the contributions of these data sources is needed to avoid training the SLM essentially just from Application_1 data.

The token selector 5 can also makes sure that every word included in its output is common to at least some predetermined number, M, of the N applications. This is done to avoid polluting the generic class-based SLM training set with words that are specific to a single application or used in only an insignificantly small number of applications.

Further, the token selector 5 can also increase the weight of certain types of tokens, such as tokens that do not contain any filler words or tokens that contain only a single rule (e.g., "<collection>" or "<command>"). This can be done empirically in order to match as closely as possible the grammar-based correct acceptance rates when no rejection is applied.

Of course, the token selector 5 can perform other functions in addition to, or instead of, those mentioned here. For example, in one embodiment, the token selector 5 uses a list of words that are to be kept in the final word list of the SLM.

The output of the token selector 5 is then applied to an SLM trainer 7 to create the generic class-based SLM 8. Any of various conventional SLM training algorithms may be used to implement the SLM trainer 7. One example of such an algorithm is SRILM, the SRI Language Modeling toolkit from SRI International. Another example is the CMU Statistical Language Modeling Toolkit described in R. Rosenfeld, "The CMU Statistical Language Modeling Toolkit", Carnegie Mellon University, Pittsburgh, Pa.

To use the generic class-based SLM 8 for a particular target application, one simply re-labels the <collection> and <command> stubs to point to the relevant grammars (classes), for every single context, for the target application. This results in a single context-specific SLMs for each context of the target application. Note that all of the resulting SLMs have the same topology: only the labels of the classes are different.

Figure 2:
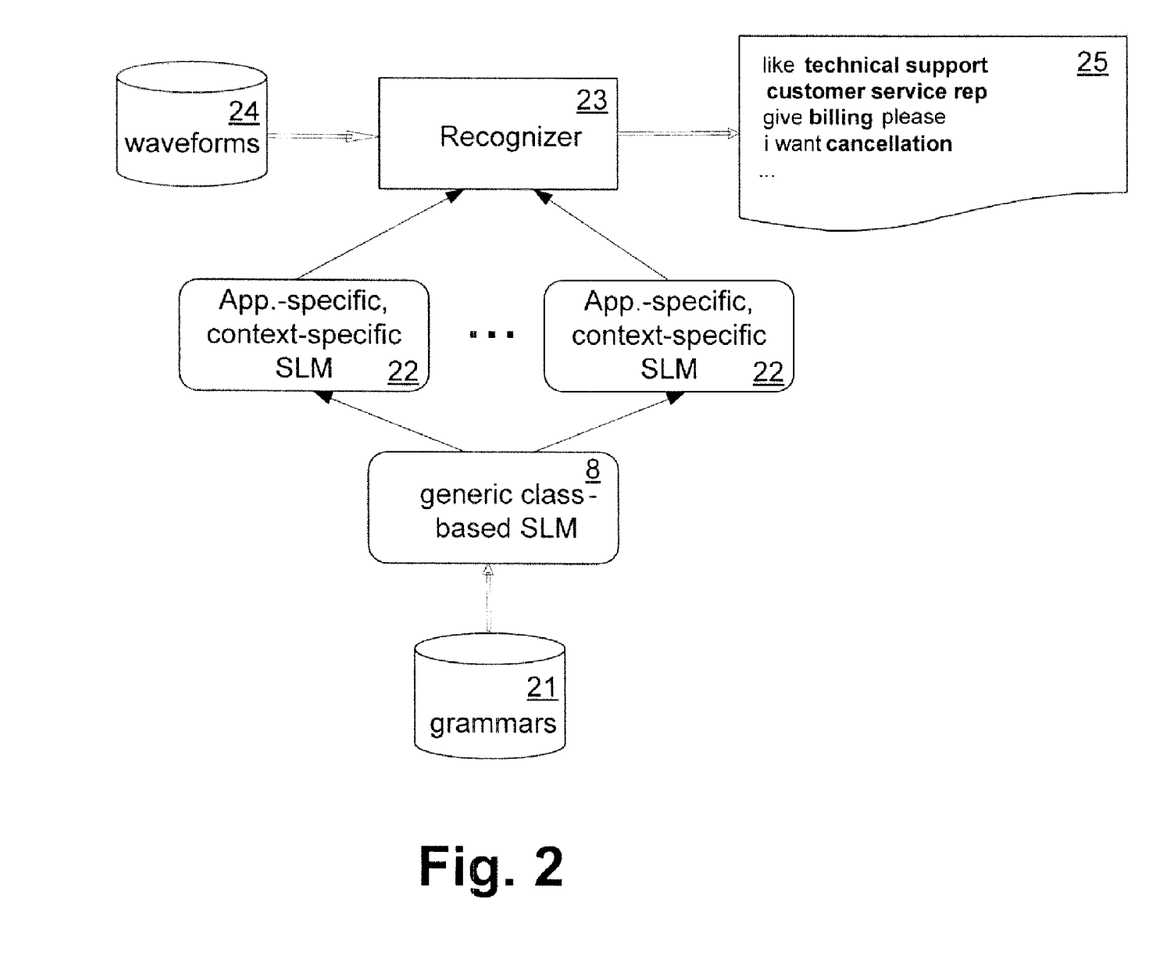
FIG. 2 shows a technique for using an application-generic class-based SLM to perform ASR.

An example of the use of the generic class-based SLM is illustrated in FIG. 2. The dialog-state-specific grammars 21 for a target application are applied to the generic class-based SLM 8 by substituting the specific class names for the generic labels, as mentioned above, to produce multiple application-specific, context-specific SLMs 22. Those resulting SLMs 22 are then used by an ASR recognizer 23 to recognize input waveforms 24 representing speech (which may be pre-recorded or provided in real-time from a live speaker), to produce a recognition result 25.

It has been found that the performance of a generic class-based SLM, when combined in this manner with the dialog-state-specific grammars from the target application, is about the same as that of a class-based SLM that has been specifically trained on the target application. Yet the generic class-based SLM substantially reduces the burden on the speech application provider by eliminating the need to acquire a training corpus to train an application-specific SLM.

Figure 3:
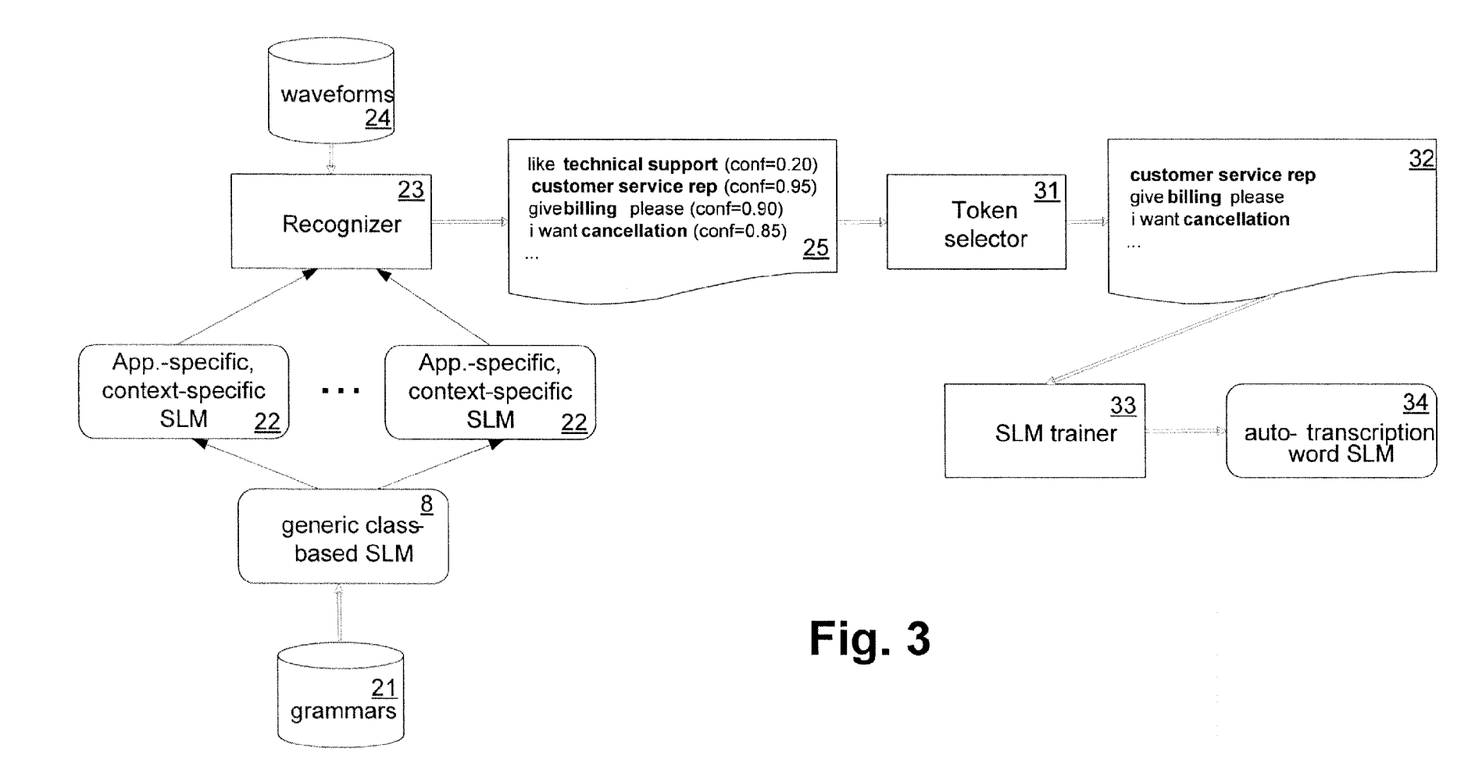
FIG. 3 shows a technique for using an application-generic class-based SLM to automatically transcribe speech to generate a word-based SLM.

It has been recognized that word-based SLMs tend to perform better than class-based SLMs. Accordingly, a generic class-based SLM created as described above can be used to train a word-based SLM, as illustrated in FIG. 3. Specifically, the generic class-based SLM 8, in combination with the appropriate application-specific grammars 21, is used to automatically transcribe training utterances represented as waveforms 24, by running an ASR recognizer 23 on the waveforms 24 with the application-specific context-specific class-based SLM 22. The recognized word strings 32 that have high confidence values, as identified by a token selector 31, are then applied to an SLM trainer 33 to train a word-based SLM 34.

Figure 4:
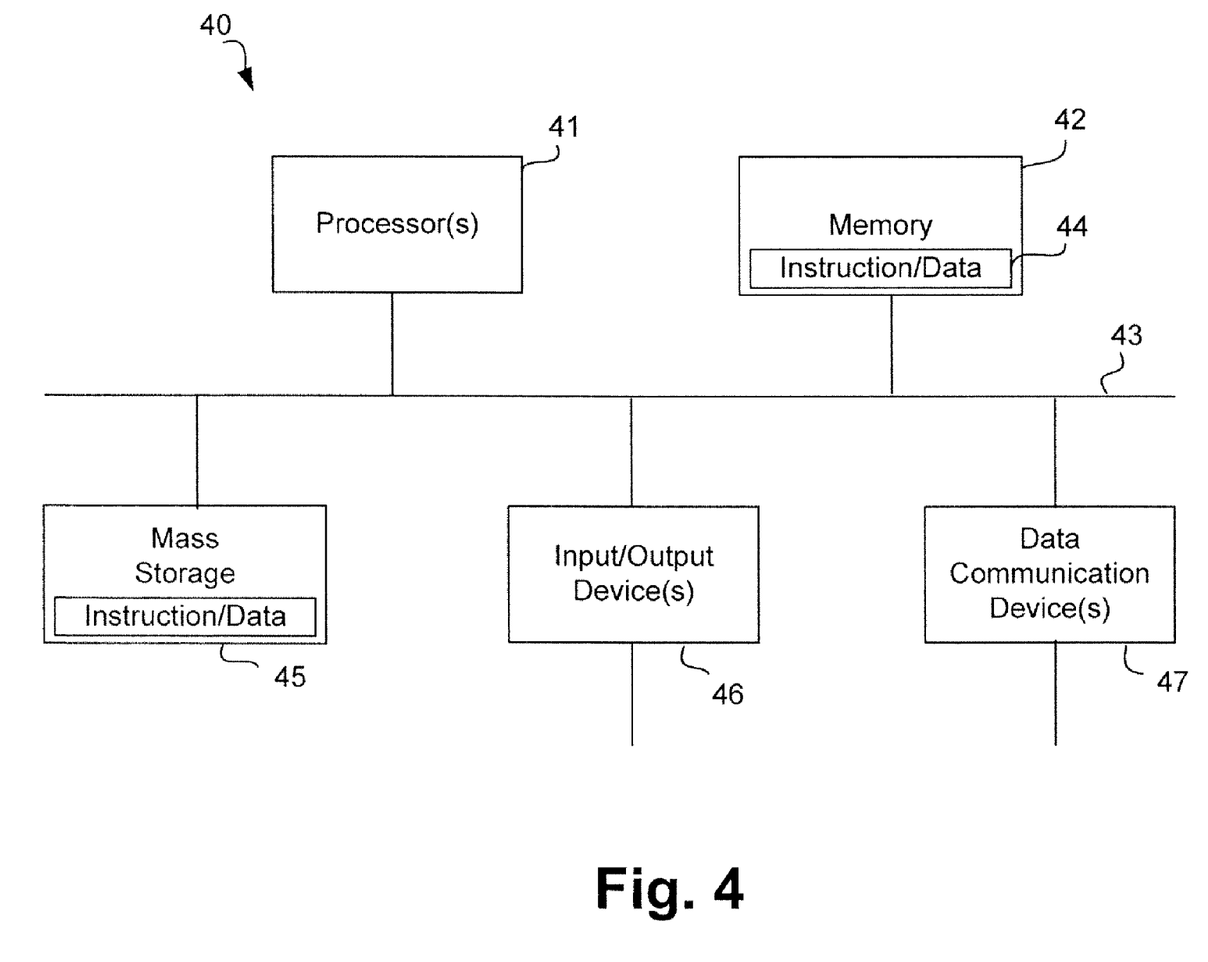
FIG. 4 is a high-level block diagram of a computer system in which the techniques introduced here can be implemented.

Thus, a technique for creating and using generic class-based statistical language models for automatic speech recognition has been described. FIG. 4 shows at a high level a computer system in which the techniques introduced above can be implemented. Certain standard and well-known components which are not germane to the present invention are not shown. Further, some of the illustrated components may be omitted in certain embodiments, as will be recognized by those skilled in the art.

The computer system 40 includes one or more processors 41 and memory 42, coupled to a bus system 43. Memory 42 includes any one or more of various forms of random access memory (RAM), read-only memory (ROM), flash memory, etc.

The bus system 43 shown in FIG. 4 is an abstraction that represents any one or more separate physical buses and/or point-to-point connections, connected by appropriate bridges, adapters and/or controllers. The bus system 43, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 41 form the CPU of the computer system 40 and, thus, control its overall operation. In certain embodiments, the processors 41 accomplish this by executing software stored in memory 42. Each processor 41 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 42 includes the main memory (system memory) of the computer system 40 and stores instructions (software and/or firmware) and data 44. The instructions/data 44 can include instructions and/or data to implement the techniques introduced above.

Also connected to the processors 41 through the bus system 43 are a non-volatile mass storage device 45 (e.g., a disk drive), one or more input/output devices 26 and a data communication device 47.

The data communication device 47 provides the computer system 40 with the ability to communicate data with remote devices, such as other computers or peripheral devices, over a data network and may be, for example, an Ethernet adapter, a Fibre Channel adapter, a DSL adapter, a cable modem, etc. The input/output device(s) 46 are devices that enable a human user to directly interact with the computer system 46. These devices 46 are, of course, optional if the computer system 40 is implemented only as a server.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   accessing a corpus of terms by a parser using a processor in each of a plurality of speech applications;
   parsing, using said parser and said processor, said corpus of terms in each speech application to produce a plurality of first output sets, in which expressions identified in the corpus are replaced with corresponding grammar tags from a grammar that is specific to the application, wherein said grammar tags are selected from among command grammar tags and collection grammar tags;
   accessing said plurality of first output sets by a class-relabeler and said processor;
   replacing by the class-relabeler and said processor, for each of the plurality of speech applications, each of the grammar tags in the plurality of first output sets with a class identifier of an application-generic class, to produce plurality of a second output sets;
   accessing said plurality of second output sets by a token selector and said processor;
   processing collectively, by said token selector and said processor, the plurality of second output sets or data derived from the output sets with a statistical language model (SLM) trainer; and
   generating, using said processor, an application-generic class-based SLM using a set of results from said SLM trainer.

2. A method as recited in claim 1, wherein the application-generic class-based SLM includes one or more of said class identifiers.

3. A method as recited in claim 2, further comprising:
   creating, using said processor, an application-specific class-based SLM for a target speech application by replacing each said class identifier in the application-generic class-based SLM with a pointer to an application-specific grammar for the target speech application.

4. A method as recited in claim 3, wherein said application-specific grammar is a class of the SLM.

5. A method as recited in claim 1, wherein said parsing comprises:
   for each identified expression, identifying, using said processor, a type of grammar to which the expression corresponds; and selecting a grammar tag to replace the expression based on the identified type of grammar.

6. A method as recited in claim 5, wherein said identifying a type of grammar comprises determining, using said processor, whether the expression corresponds to a command grammar or a collection grammar.

7. A method as recited in claim 6, wherein said replacing each of the grammar tags in the first output set with a class identifier of an application generic class comprises:
   replacing, using said processor, a grammar tag with a first class identifier if the grammar tag is determined to correspond to a first type of grammar; and
   replacing, using said processor, a grammar tag with a second class identifier if the grammar tag is determined to correspond to a second type of grammar.

8. A method as recited in claim 7, wherein the first type of grammar is a command grammar and the second type of grammar is a collection grammar.

9. A method as recited in claim 1, further comprising:
   prior to said processing, performing on the second output sets collectively at least one operation from the set of operations consisting of:
     balancing, using said processor, between the second output sets according to a size of the corpus of the corresponding speech applications;
     filtering, using said processor, the second output sets to remove expressions that are not present in the corpus of at least a predetermined subset of the plurality of speech applications; and
     assigning, using said processor, weights to tokens in the second output sets.

10. A method as recited in claim 1, further comprising:
    executing, using said processor, an automatic speech recognition (ASR) process to recognize speech represented in a stored set of audio data associated with a target speech application, by using an application-specific grammar for the target: speech application in combination with the application-generic class-based SLM, to generate a set of recognition results.

11. A method as recited in claim 10, further comprising:
    processing, using said processor, at least a portion of the set of recognition results with an SLM trainer to generate a word-based SLM for use in ASR for the target speech application.

12. A method as recited in claim 11, further comprising:
    using the word-based SLM to perform ASR for the target speech application.

13. A method of creating a statistical language model (SLM) for automatic speech recognition (ASR), the method comprising:
    for each of a plurality of speech applications, parsing a corpus of utterance transcriptions, with a parser and a processor, from the application to produce a first output set, in which expressions identified in the corpus are replaced with corresponding grammar tags from a grammar that is specific to the application wherein said grammar tags are selected from among command grammar tags and collection grammar tags, wherein said parsing includes:

for each identified expression, identifying, with said parser and said processor, a type of grammar to which the expression corresponds, including determining whether the expression corresponds to a first grammar or a second grammar, and selecting, with said parser, a grammar tag to replace the expression based on the identified type of grammar;

for each of the plurality of speech applications, replacing, with a class relabeler and said processor, each of the grammar tags in the first output set with a class identifier of an application-generic class, to produce a second output set, including:

replacing, with said class-relabeler and said processor, the grammar tag with a first class identifier if the grammar tag is determined to correspond to a grammar of the first type, and replacing, with said class-relabeler and said processor, the grammar tag with a second class identifier if the grammar tag is determined to a grammar of the second type;

filtering, with a token selector and said processor, the second output sets collectively based on an algorithm to produce a third output set; and processing the third output set with an SLM trainer and said processor; and generating an application-generic class-based SLM for ASR using a set of results from said SLM trainer and said processor, wherein the application-generic class-based SLM includes one or more of said class identifiers.

14. A method as recited in claim 13, wherein the first type of grammar is a command grammar and the second type of grammar is a collection grammar.

15. A method as recited in claim 14, wherein said filtering comprises at least one operation from the set of operations consisting of:

balancing, using said processor, between the second output sets according to a size of the corpus of the corresponding speech applications;

filtering, using said processor, the second output sets to remove expressions that are not present in the corpus of at least a predetermined subset of the plurality of speech applications;

assigning, using said processor, weights to tokens in the second output sets.

16. A method as recited in claim 13, further comprising:

creating, using said processor, an application-specific class-based SLM for ASR for a target application by replacing each said class identifier in the application-generic classbased SLM with a reference to an application-specific grammar for the target application.

17. A method as recited in claim 16, wherein said application-specific grammar is a class of the SLM.

18. A method as recited in claim 16, further comprising generating a word-based SLM for use in ASR, for the target speech application, by:

executing, using said processor, an ASR process to recognize speech represented in a stored set of audio data associated with the target speech application, by using said application-specific class-based SLM to generate a set of recognition results; and processing, using said processor, at least a portion of the set of recognition results with an SLM trainer to generate the word-based SLM for use in ASR, for the target speech application.

19. A method as recited in claim 18, further comprising:

using the word-based SLM to perform ASR for the target speech application.

20. A method comprising:

accessing, using a processor, a corpus of terms by a parser in each of a plurality of speech applications;

parsing, using said parser and said processor, said corpus of terms in each speech application to produce a plurality of first output sets, in which expressions identified in the corpus are replaced with corresponding grammar tags from a grammar that is specific to the application, wherein said grammar tags are selected from among command grammar tags and collection grammar tags:

accessing, using said processor, said plurality of first output sets by a class-relabeler;

replacing, using said processor, by the class-relabeler, for each of the plurality of speech applications, each of the grammar tags in the plurality of first output sets with a class identifier of an application-generic class, to produce plurality of a second output sets;

accessing, using said processor, said plurality of second output sets by a token selector; and processing, using said processor, collectively, by said token selector, the plurality of second output sets or data derived from the output sets with a statistical language model (SLM) trainer;

generating, using said processor, an application-generic class-based SLM using a set of results from said SLM trainer; and creating, using said processor, an application-specific SLM for use in automatic speech recognition for a target speech application, by incorporating into the application generic class-based SLM an application-specific grammar for the target speech application.

21. A method as recited in claim 20, wherein the application-specific grammar is a class of the SLM.

22. A method as recited in claim 21, wherein creating an application specific SLM comprises replacing, using said processor, a generic class identifier in the application generic class-based SLM with a reference to an application-specific grammar for the target speech application.

* * * * *